H. R. DOWNEY.
TRANSMISSION SPRING COMPRESSOR AND HOLDER.
APPLICATION FILED APR. 23, 1921.

1,433,944.

Patented Oct. 31, 1922.

Inventor
H. R. Downey

Patented Oct. 31, 1922.

1,433,944

UNITED STATES PATENT OFFICE.

HUGH R. DOWNEY, OF MERNA, NEBRASKA.

TRANSMISSION-SPRING COMPRESSOR AND HOLDER.

Application filed April 23, 1921. Serial No. 463,921.

*To all whom it may concern:*

Be it known that I, HUGH R. DOWNEY, a citizen of the United States, residing at Merna, in the county of Custer, State of Nebraska, have invented new and useful Transmission-Spring Compressors and Holders; and I do hereby declare the following to be a full, clear, and exact description of the invention, such as will enable others skilled in the art to which it appertains to make and use the same.

The invention relates to spring compressors and holders, for compressing and holding transmission band springs, which band springs are carried by bolts disposed in a removable section of a transmission casing. It is one of the primary objects of the invention to provide a tool which may be disposed on the spring carrying bolts and utilized for compressing the springs and holding the same in compressed condition as the casing section is being placed in position and the bolts disposed in engagement with bifurcations of lugs carried by the ends of the transmission band, also to provide the device with adjustable fingers, which fingers will interengage with members carried by the bolts thereby allowing the bolt carried springs to be utilized for holding the bolts against rotation when the transmission casing section is being placed in position on the main casing.

A further object is to provide a transmission spring compressor comprising a pair of spaced plates having notches for the reception of the transmission bolts, said plates being provided with crossed handles adapted to be grasped by the operator for compressing the springs. Also to provide means for holding the handles together after the spring has been compressed.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1:
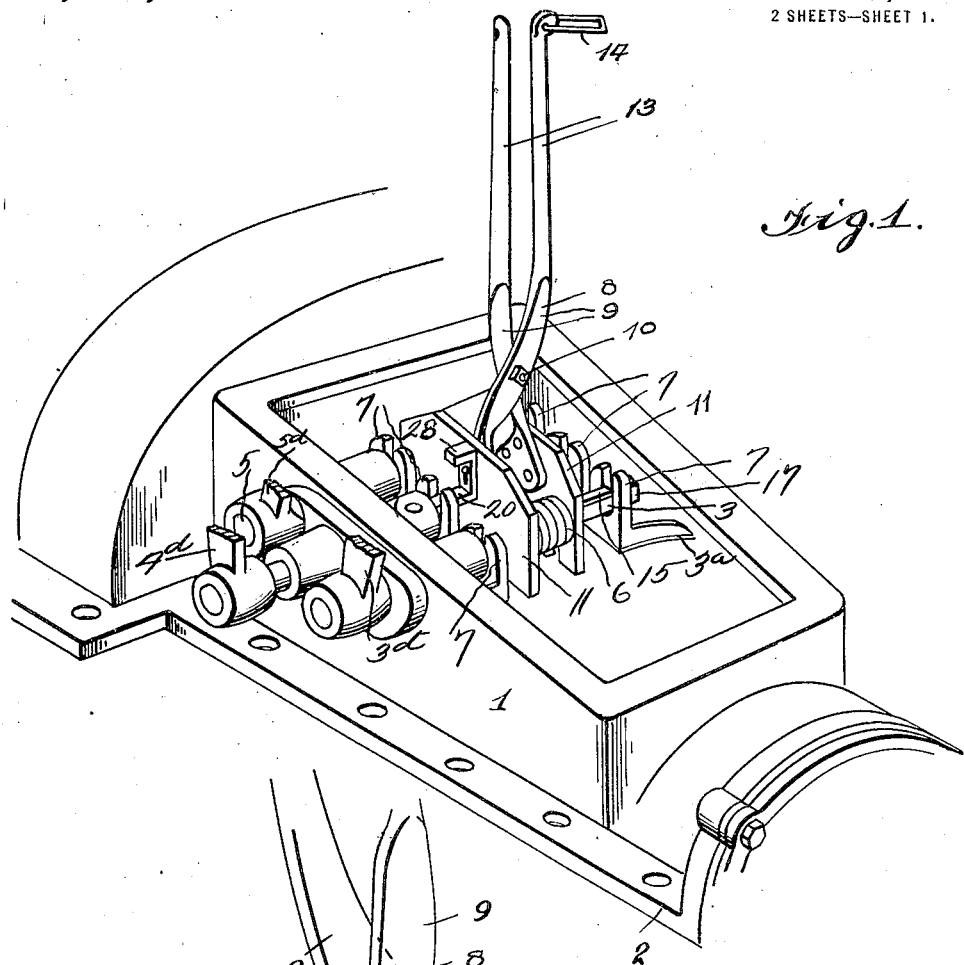
Figure 1 is a perspective view of the transmission casing, showing the removable section thereof and the spring contractor and holder in position.
Figure 2:
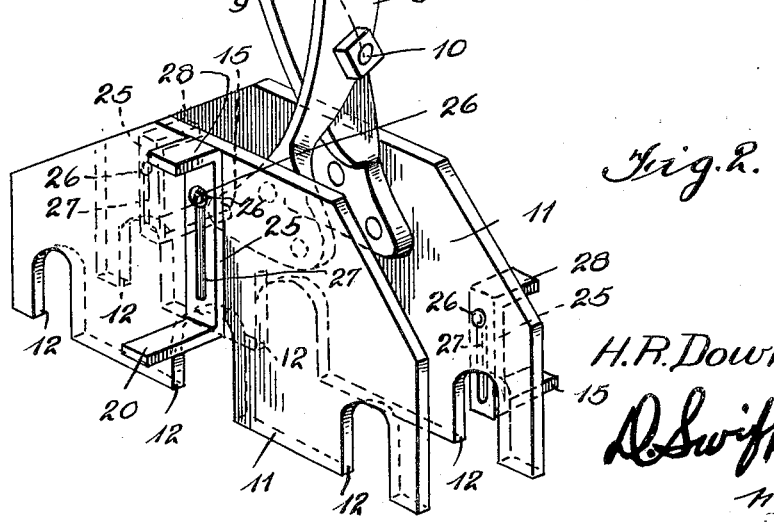
Figure 2 is an enlarged detail perspective view of the lower end of the spring contractor.
Figure 3:
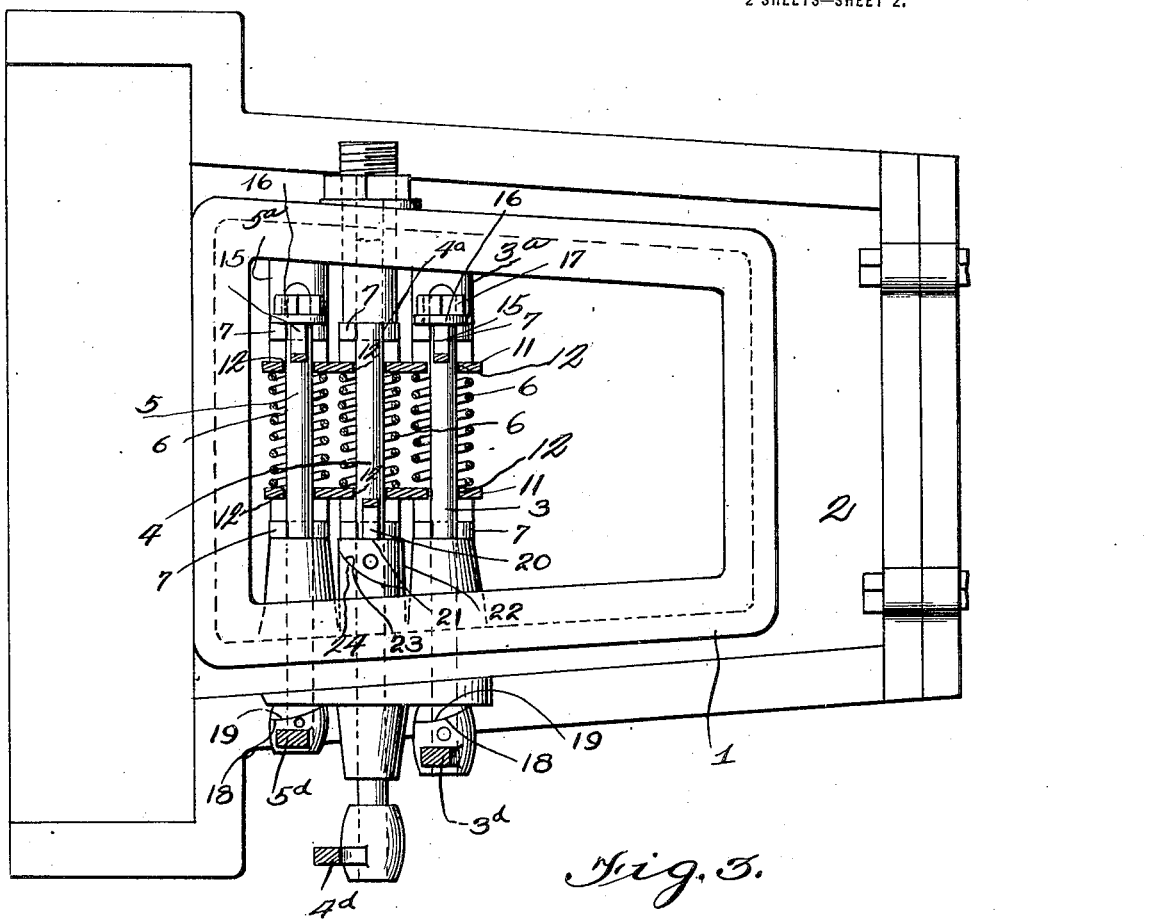
Figure 3 is a top plan view of the transmission casing showing the levers carried thereby and the spring compressor placed in position thereon and in horizontal section.

Referring to the drawings, the numeral 1 designates the removable section of the transmission casing 2, which section has disposed therein rockable shafts 3, 4 and 5, which shafts control the brake band 3ª, the low speed band 4ª, and the reverse band 5ª. Disposed on the rockable shafts 3, 4 and 5, are coiled springs 6, which springs when the removable casing section 1 is disposed on the transmission casing 2 engage between the bifurcated lugs 7 of the bands and normally maintain the bands expanded and out of frictional engagement with the drums around which they extend, at which time the rockable shafts 3, 4 and 5 are disposed in the bifurcations of the bifurcated lugs 7. When the removable casing 1 is placed in position it is necessary for the operator to compress the springs so that they will engage the lugs 7, and at the same time hold the rockable shafts 3, 4 and 5 against rotation. This operation consumes considerable time and is an exceedingly awkward one. To overcome the above difficulty a spring compressing tool 8 is provided. The spring compressing tool 8 comprises crossed handles 9, which are pivoted together as at 10 and to the lower ends of which handles are secured plates 11. Plates 11 are provided with spaced recesses 12, which recesses receive the rockable shafts 3, 4 and 5 at points outside the ends of the spring 6 and when the plates 11 are forced together by the operator who grasps the handle members 13, said plates compress the springs 6 and when the springs are so compressed, if so desired the loop 14 carried by one of the handle members 13 may be placed over the end of the adjacent handle member thereby holding the springs 6 in compressed condition. It has been found that during the replacing of the section 1 that the rockable shafts 3, 4 and 5 and their pedals 3ᵈ, 4ᵈ, and 5ᵈ pivot from side to side in such a manner as to render it difficult to properly control the parts during an assembling operation. To overcome this difficulty one of the plates 11 is provided with outwardly extending fingers 15 which pass through the bifurcations of the lugs 7 and engage against the washers 16 which are locked to the nuts 17 by pins or in any other suitable manner. With the loop out of engagement with the adjacent handle 13 it will be seen that the expansible action of the springs 6 will maintain the fingers 15 in binding engagement with said washers and consequently the shafts 3 and 5 will be prevented from rotation by said fingers, and by the engagement of the cam surfaces 18 and 19 with each other. Extending outwardly from the outer side of the other plate 11 is a finger 20, which finger engages a shoulder 21 of the enlargement 22, which finger maintains the cam surfaces 23 and 24 in close engagement with each other and consequently prevent rotation of the shaft 4. It will be seen that all of the springs 6 are simultaneously compressed and held and that the shafts 3, 4 and 5 are prevented from rocking in their bearings when the removable section 1 of the casing is being replaced on the transmission casing 2. It will also be seen that the plates 11 will be spaced inwardly from the lugs 7 of the brake bands, thereby allowing the ends of the rockable shafts 3, 4 and 5 to be received within the bifurcations of the lugs 7 when the casing section 1 is disposed in position. Before the casing section 1 is placed in position the brake bands are so positioned that their lugs 7 will be in longitudinal alignment and the bands contracted in any suitable manner. However they are preferably contracted and held in longitudinal alignment by means of a holding device as shown in my application filed the 23rd day of April 1921, Serial No. 463,922.

After the removable casing section has been placed in position and the nuts 17 properly adjusted the handle members are forced together or pulled directly upwardly for releasing the springs and allowing the same to engage between the lugs 7 and function as expanding means for the bands. The fingers 15 and 20 are preferably carried by vertically adjustable members 25, which members are vertically adjustable on the plates 11 by means of screws 26 and slots 27, said screws extending through said slots and into the plates 11. The upper ends of the vertically adjustable members 25 are provided with finger engaging members 28 by means of which finger engaging members the fingers 15 and 20 may be moved to various positions and held until securely held by the set screws 26.

From the above it will be seen that a tool is provided for compressing and holding the springs of transmission mechanisms of the type where the springs are carried by transversely disposed rockable controlling bolts rockably mounted in a detachable section of the transmission casing, and also so constructed that said bolts will be held against motion during the operation of replacing the casing section. It will also be seen that the tool is simple in construction and may be easily and quickly applied to the transmission mechanism.

The invention having been set forth what is claimed as new and useful is:—

1. A tool of the character described comprising spaced plates having a plurality of notches in the lower edges thereof for the reception of rockable transmission bolts, said plates being adapted to engage the edge of springs and compress the same, and members carried by said plates and adapted to cooperate with the rockable bolts for holding said bolts against movement.

2. A tool of the character described comprising spaced plates having notches in the lower edges thereof, said notches being adapted to receive transmission bolts with the plates in engagement with the ends thereof, means whereby said plates may be forced towards each other for compressing springs disposed therebetween and means carried by the plates for preventing rotation of the bolts.

3. A tool of the character described comprising spaced plates having registering notches therein for the reception of the brake, low speed and reverse bolts of the bands of a transmission mechanism, said bolts being disposed in bifurcated lugs carried by said bands, said plates being adapted to engage the ends of springs carried by said bolts, means whereby said plates may be forced toward each other, and members carried by the plates and adapted to extend through the bifurcations of the band lugs and cooperate with the bolts for preventing rockable movement of said bolts.

In testimony whereof I have signed my name to this specification in the presence of two subscribing witnesses.

HUGH R. DOWNEY.

Witnesses:
W. M. HOFFMAN,
PHILIP LINELL.